United States Patent [19]

Kozlowski

[11] 4,427,178

[45] Jan. 24, 1984

[54] ACCESSORY FOR WHEELED FLOOR JACK

[76] Inventor: Stanley J. Kozlowski, 8443 S. Brandon Ave., Chicago, Ill. 60617

[21] Appl. No.: 405,001

[22] Filed: Aug. 4, 1982

Related U.S. Application Data

[63] Continuation of Ser. No. 181,440, Aug. 25, 1980, abandoned.

[51] Int. Cl.[3] .................... B60P 1/48

[52] U.S. Cl. .................... 254/1; 254/8 B; 254/84; 254/DIG. 1

[58] Field of Search .................... 254/DIG. 1, 1, 84, 85, 254/8 B; 248/348, 298; 104/1 R; 7/100

[56] References Cited

U.S. PATENT DOCUMENTS

| | | | |
|---|---|---|---|
| 942,170 | 12/1909 | Dunlap | 254/85 |
| 1,887,924 | 11/1932 | Evans | 254/1 |
| 2,553,652 | 5/1951 | Gradle et al. | 248/346 |
| 2,580,743 | 1/1952 | Eckels | 254/1 |
| 2,587,067 | 2/1952 | Sachheber | 254/8 B |
| 3,588,046 | 6/1971 | Weaver | 254/85 |
| 3,874,639 | 9/1975 | Wilson | 254/85 |
| 4,146,208 | 3/1979 | Ciccarelli | 254/85 |

FOREIGN PATENT DOCUMENTS

| | | | |
|---|---|---|---|
| 1366918 | 9/1974 | United Kingdom | 254/8 B |

*Primary Examiner*—Robert C. Watson
*Attorney, Agent, or Firm*—Richard G. Kinney

[57] ABSTRACT

An attachment or accessory to a wheeled floor jack of the type that rolls during use is disclosed. The accessory comprises a flat, elongated guard sized to receive and carry the wheels of the jack and to captivate them within it. The accessory provides a flat platform or base on which and within which the jack can roll and over which the weight lifted can be spread and serves to keep the wheels from the ambient surface. The attachment thus overcomes the problem encountered when using such jacks on a soft surface, such a snow, sand, dirt or asphalt, of having the wheels embed and the jack "snow plow," or slip. The attachment is designed to remain attached to the jack after insertion, but to easily receive the jack and be removed from it. The attachment also aids in handling the jack and limits or eliminates undesirable rolling, for example, when the jack is stored in the trunk of an automobile.

7 Claims, 9 Drawing Figures

ACCESSORY FOR WHEELED FLOOR JACK

This application is a continuation, of application Ser. No. 181,440, filed Aug. 25, 1980, now abandoned,

FIELD OF THE INVENTION

The present invention is directed to an improvement in wheeled floor jacks and is especially concerned with an attachment for or accessory to such jacks.

BACKGROUND OF THE INVENTION

Wheeled floor jacks have been in use for many years to raise and lower automobiles. Large capacity models of heavy duty construction and weight have been the mainstay of professional car repair shops and service stations. Smaller, e.g. 1, 1¼, and 1½ ton capacity floor jacks of lighter weight and construction have been marketed for some time for use by such repair shops for road service and general use. Due to their small size and light weight the general public has adapted them for home use as well and also as a spare jack to be used by the car owner and carried in the trunk of the car.

Examples of such conventional floor jacks are depicted in U.S. Pat. Nos. 4,018,421 and 4,131,263; advertised, for example, in Norco Form 842, 8–77, and in the Key Bar Model 2030 owner manual, both published by Norco Industries, Inc. of Gardena, Calif. Portable floor jacks of a similar nature have been shown on page 91 of Catalog No. 397B of the J. C. Whitney & Co., 1917 Archer Avenue, Chicago, Ill. Numerous other manufacturers and marketers, including those marketed under the Blackhawk trademark, are available.

Such wheeled floor or service jacks, while generally quite useful and popular, do suffer from some drawbacks. A major problem with such jacks results from the requirement that the jack move relative to the load (normally a car) while lifting it. While not a problem on hard surfaces, such as a concrete pad, this is a problem when one attempts to use the jack on a softer or uneven surface such as gravel, hot blacktop surfacing, dirt, snow or sand. Of course, when used as a trunk-carried jack, the jack must be useful on whatever surface the vehicle finds itself.

In typical use, in raising an automobile on such a soft surface, upon taking up some weight of the vehicle, the jack's wheels quickly bite into and sink so that the jack frame rests on the surface. But as it is necessary that the jack frame move relative to the vertical contracting saddle because of the basic design of such jacks, and the automobile is braked and preferably blocked so as not to roll (as per operating instructions of most jack manufacturers), then the frame must "snow plow" into the surface or else the saddle must "slip" relative to the vehicle. Of course, the latter can be harmful to the vehicle and/or the jack and could also cause serious injury to the user if an accidental dropping of the vehicle should occur. Also, when on blacktop surfaces, such as house driveways, the blacktop surface will be permanently "dented" or scarred.

While some have recognized the problem of wheel indenting in other types of jacks and provided a flat platform or base for the jack to spread the weight of the vehicle (e.g. U.S. Pat. Nos. 2,635,715; 2,594,270; 2,563,927; and 2,173,598) such have not been applied to wheeled floor jacks and indeed, if so applied, would result in a dangerous or unworkable jack.

While others have made low-slung lifting jacks for a special purpose (e.g. of car side only—e.g. Blackhawk roadside model 67393-1 ton) and eliminated the wheels, such stationary jacks are of limited use due to the low 1 ton capacity and because of the side only use, it makes it problematic to lift a car alongside a curb. Furthermore, such stationary jacks may be dangerous when used at other than their intended lifting points and for other applications.

SUMMARY OF THE PRESENT INVENTION

The present invention provides an accessory or attachment for a wheeled floor jack which allows the jack to be easily used on soft and semi-soft surfaces and allows the jack to be easily handled and stored when in the trunk. In accordance with the present invention, such an accessory comprises a guard, sized and shaped to encompass and includes means to loosely captivate the wheels of the jack and to provide a flat, hard surface for them to roll on. The guard defines an operating path within it to enable the jack to move horizontally, which path is long enough to enable the saddle of the jack to substantially move over its vertical path without horizontal displacement. That is, without slipping off its original contact point with the load.

This arrangement has the advantage of allowing the weight of the load to be spread about the bottom of the guard and prevents "snow plowing" or saddle slippage.

The invention, together with the advantages thereof, may best be understood by reference to the following description taken in connection with the accompanying drawings, in the several figures of which, like reference numerals identify like elements.

DETAILED DESCRIPTION

Figure 1:
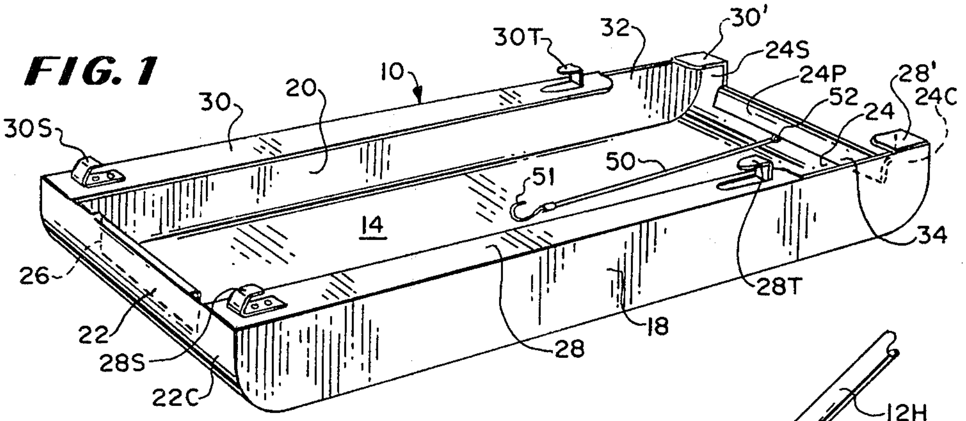
FIG. 1 is a perspective view of an accessory or attachment constructed in accordance with the present invention.
Figure 2:
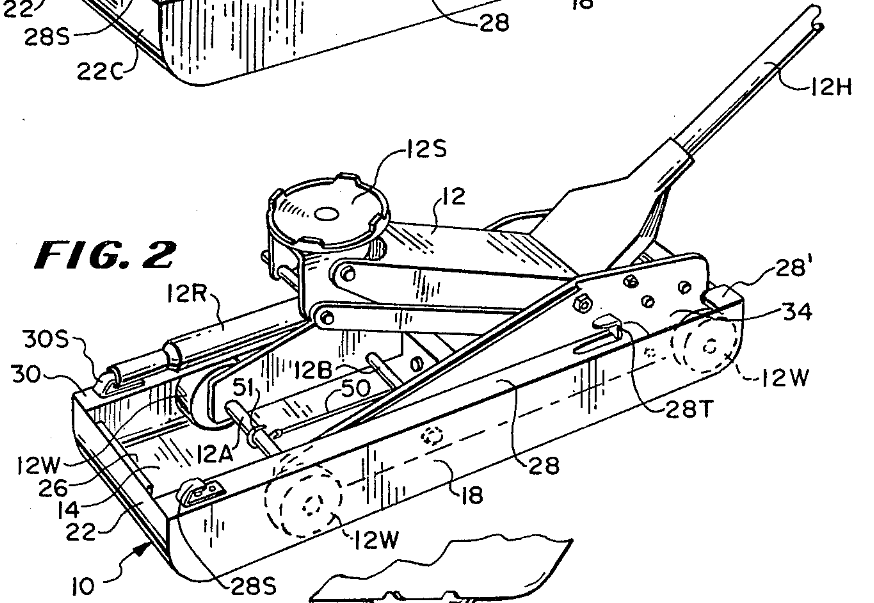
FIG. 2 is a perspective view of the accessory of FIG. 1 in use with a jack.
Figure 3:
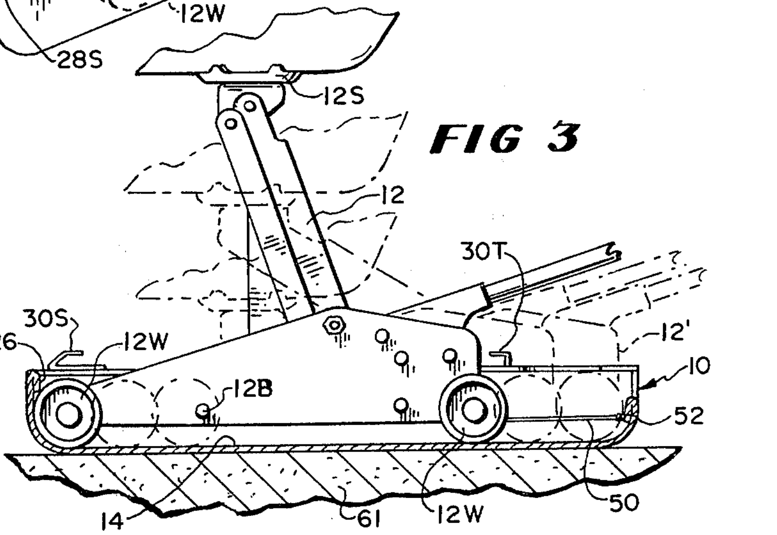
FIG. 3 is a side view of the accessory of FIGS. 1 and 2 in use with a jack.
Figure 4:
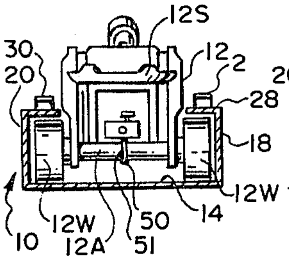
FIG. 4 is a sectional end-view of the accessory and jack.

Referring to FIGS. 1–4, there is depicted a guard 10 for a wheeled jack such as the jack 12 as shown in FIGS. 2, 3 and 4. The guard 10 has a generally rectangular base 14 in which the wheels 12W of the jack 12 rest when in use. As best seen in FIG. 1, arising from the base 14 are parallel upstanding sidewalls 18 and 20 which extend the length of the base. The sidewalls are spaced apart slightly more than the clearance between the wheels of the jack 12 so as to receive those wheels with easy clearance between the sidewalls 18 and 20 and them (FIG. 4). The guard 10 includes endwalls 22, 24 each of which has a curving bottom portion (such as 22C of FIG. 1) merging into the base 12 and curved at the curvature of the wheels of the jack. The marginal portion 26 of this wall 22 is bent down along the top of the wall 22 to form a handle at the front end of the guard 10. Longitudinal top marginal walls 28 and 30 project inside for short distances from the tops of the sidewalls 18 and 20.

These longitudinal marginal walls 28 and 30 are continuous from the front wall 22 to the back wall 24 except for two oppositely disposed cut-out sections 32 and 34. These sections are sized to receive the wheels 12W of the jack 12 as will be explained below. The wall 24 has end sections 24S and 24C which rise up and meet with the marginal top wall sections 28', 30' of the marginal walls 28, 30.

Formed rearward on the walls 28 and 30, near the opening 32, 34 are, respectively, upstanding tabs 28T and 30T which are formed from the walls 28 and 30 by cutting out and folding upward a finger-shaped portion of the walls. Spaced from these tabs on the walls 28 and 30 are secured, near the front wall 22, upstanding spring tabs which are respectively designated 28S and 30S. These spring tabs 28S and 30S are preferably made by securing short finger lengths of spring metal to the top of the walls 28 and 30 as by spot welding.

The pair of tabs 28T and 28S serve to releasably secure for storage the tubular jack handle front section 12H and the tabs 30S and 30T serve to similarly secure the jack handle rear section 12R as shown in FIG. 2. (These conventional sections 12H and 12R interlock to form the full jack handle).

These tubular handle sections are secured by placing one end in the spring tab 30S or 30T, resiliently bending it forward (by bending the section forward slightly) until the rear of the section can enter the opening of the rear tab 28T or 30T and then allowing the spring tab and section to return. The section 12H or 12F is then held by the tabs 28T and 28S or 30R and 30S. They can be easily removed by reversing the process.

The rear wall 24 of the guard 10 includes a turned-down portion 24P which serves to reinforce the rear wall and also may be used to secure a tensioning or biasing unit. This tensioning unit 50 is preferably a length of shock cord or strap secured at one end 52 in any convenient permanent manner to the end wall 24 and with a hook 51 at its free end. The unit 50 can, as shown in FIG. 2, have the hook 51 releasably attached to the axle 12A of the jack 12. (It may be attached at any other convenient position such as the brace 12B of the jack 12.) The tension strap 50 is attached to the guard 10 and jack 12 to eliminate unwanted movement with the guard (e.g. when transporting the jack in a vehicle) yet provide sufficient tension in its rearmost position to be in the ready position for use at all times. Also, enough elasticity is generated by the strap to allow the jack 12 to roll with the operating path and enables the jack 12 to move horizontally therealong.

As shown in FIGS. 2, 3, and 4, the sidewalls 18, 20 are sized so as to place the marginal walls 28, 30 over the wheels 12W of the jack 12 and prevent them from easily leaving the guard 10. Also, as can be seen from these figures, the base 14 extends longer than the length of the jack 12. As best seen in FIG. 3, this length allows the guard to serve as a non-moving shield for the moving jack frame and wheels 12W as the jack extends vertically and contacts and lifts a vehicle 60 or other load, e.g. between the position shown in phantom lines in FIG. 3 and that shown in solid lines in the same figure.

Figure 5:
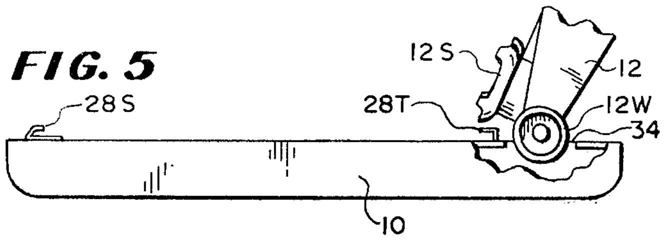
FIG. 5 is an elevational view of the accessory of FIGS. 1–4 with a jack shown partially.
Figure 6:
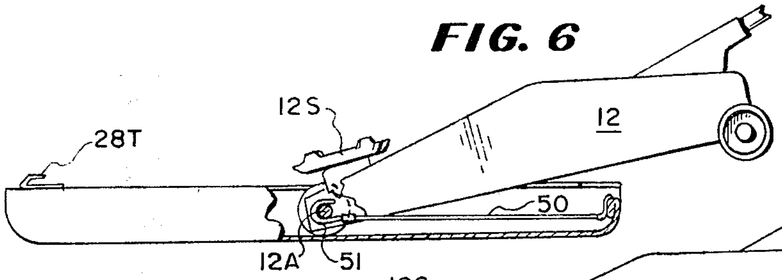
FIGS. 6 and 7 and views similar to FIG. 5 of the accessory of FIGS. 1–5 with the jack in a moved position.
Figure 7:
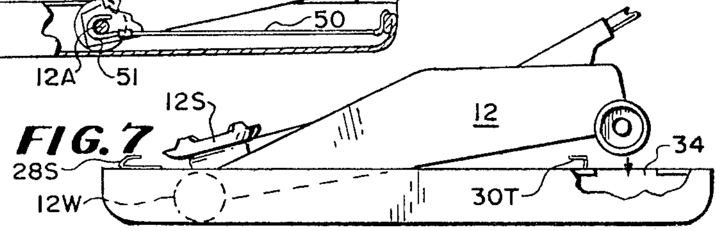

The jack 12 is placed in and releasably captivated by the guard 10 as shown in FIGS. 5, 6, and 7. That is, the jack 12 is aligned such that its frame is parallel to the opening of the guard 10 with the front wheels inserted into the openings 32, 34 (FIG. 5). Once in, the front wheels 12W are rolled forward and the hook 51 of the tensioning strap is looped over the axle 12A as shown in FIG. 6. The jack 12 is continuously moved forward (tensioning and stretching the strap 50) until the rear wheels can and do enter and, as shown in FIG. 2, the entire jack's wheels are rolled forward of the entry 32, 34 (FIG. 7).

Note that the wall segments 28', 30' are such as to prevent the exit of the wheels when the jack is in the rearmost position and that the tensioning strap 50 urges and holds the jack in the jack in that rearmost position. Thus only when the rear wheels are aligned exactly with the position of the opening 32, 34 can the jack be removed.

When used to raise a load, e.g. a vehicle 60, the jack 12 and guard 10 combination is placed under the vehicle on the ambient surface. The curvature on the bottom of the guard (front and rear) increases the ease of maneuvering the guard and jack in combination under a vehicle on irregular or rough surfaces, thus preventing the "snow plowing" effect. The jack is positioned automatically in its rearmost position within the guard 10 by the tensioning strap 50 and the saddle raised until it contacts the desired position on the vehicle 60 (FIG. 3—dashed outline). As it is raised further, the load is transferred through the jack's wheels 12W to the guard 10 which serves to shield the wheels and jack from the surface below and to spread the weight over the base 14 to the ambient surface (such as the surface 61 of FIG. 3). This means that the surface can better take the load without giving. Further, as the saddle 12S is raised vertically further, the jack 12 can and does roll forward within the guard 10 along the path defined for it on the base 14 by the sidewalls, 18, 20. It does this easily as the surface 14 is smooth and hard, unlike some of the expected ambient surfaces 61. Even if the guard 10 is driven into the surface 61 somewhat, it will still provide a hard, flat, rolling surface for the wheels 12W.

Thus the jack can roll easily forward from the position 12' to the position 12 of FIG. 3. Note that the saddle 12S, 12' are vertically aligned. This means that the jack 12 is less likely to slip or damage the car as the saddle can remain in the same position on the load.

Figure 8:
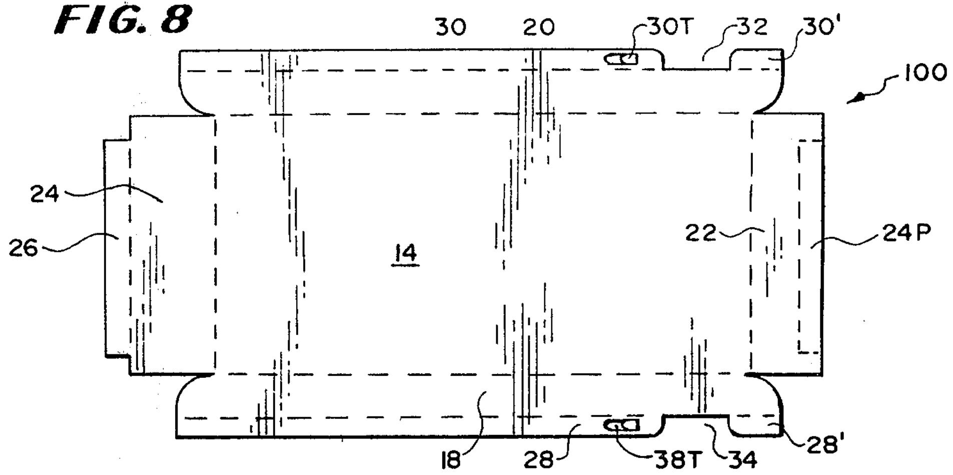
FIG. 8 is a plan view of a stamping, which view is useful in explaining a preferred method of making the accessory of FIGS. 1–6.
Figure 9:
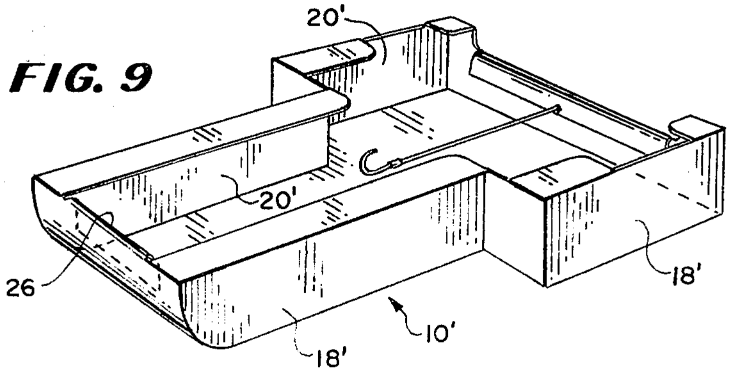
FIG. 9 is a perspective view of a second embodiment of the invention, illustrating the attachment of the invention for a different style of wheeled floor jack.

The guard 10 can be essentially made from a single sheet of metal. FIG. 8 illustrates a blank 100 cut from such a sheet. For example, for small capacity jacks (up to one and one-half tons) no. 14 gauge steel may be used. For larger capacity jacks or to provide even stronger construction, no. 12 gauge sheet steel can be used. The blank 100 is easily fabricated and assembled. With reference to FIG. 8, after stamping out the blank 100 portions 28, 30 (28' and 30') are bent at 90 degrees upward along the dashed lines, then the walls 18 and 20 are likewise bent up 90 degrees at the dashed lines. The end sections 26, 24P are bent over and then the walls 22 and 24 formed as shown in FIG. 1. The unit is then welded along the mating edges to provide a rigid and strong structure. The weld is preferably continued along all mating edges so as to provide a relatively water and mud-tight unit. The spring tab pieces 28 and 30S are then spot-welded in place.

If desired, a lighter gauge steel can be used for the end and sidewalls and this can be easily achieved by using such a blank as 100 and inserting a rectangular sheet over the base 14 and securing it to the base before the bending up of the sidewalls and endwalls.

The present invention may be adapted to various jack constructions. In FIG. 8, there is depicted a guard 10' for use in a wheeled jack of the type using casterwheels for its rear wheels. Here the back portion of the sidewalls 18', 20' is made to conform to and accommodate such wheels in a loose but close enough fit to hold them and yet define a path for the wheels and jack to travel. For some jack wheels, it may be desirable to modify them slightly so as to provide a smooth edge and prevent scratching or marking the base 14 along the edges of the wheels. However, if this becomes a problem, it can be solved by an insert or by simply using a thicker and stronger steel.

For purposes of illustration only and not for limitation, a particular prototype guard 10, substantially as depicted in FIG. 1, was constructed and tested for use with a model 2030 Keybar® floor service jack. This particular prototype had a width of about $7\frac{3}{4}$ inches, a length of about 26 inches and sidewalls about 2 and a half inches high and was made of 14 gauge sheet steel. This prototype was tested under various conditions and more than normal use and proved generally satisfactory, but was prone to a slight creasing along the sides of the front wheel path after extensive use. Such wear is considered acceptable for normal "emergency jack" use and, of course, can be avoided as mentioned above. The overlying marginal walls 28, 30 on this version were $\frac{7}{8}$ inch in width and the cut-outs 32, 34 were each $2\frac{1}{2}$ inches long and located $1\frac{1}{4}$ inches from wall 24. The overall dimensions of the blank 100 were about 14 by 32 inches.

While two particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. For example, although shown and described as being made of sheet steel, other metals and construction techniques may be employed. In particular, the design of the unit of FIGS. 1–8 lends itself to aluminum extrusion construction. Also other units may be employed to retain the jack in the rearward position such as springs, rubber straps or mechanical detents.

I claim:

1. An accessory for a wheeled floor jack of the type that has a link-mounted saddle for contacting a weight to be lifted, a frame, and which saddle and frame move horizontally relative to one another as the saddle is driven from its vertically-retracted to its vertically-extended position, and wherein there are a plurality of wheels mounted to the frame to allow the jack to roll on a hard surface while being used, comprising:

a guard, sized and shaped to encompass the wheels and to provide a flat, hard surface for the wheels to roll on, said guard defining a hard-surface operational path for the wheels which is long enough for the jack to move horizontally within the guard while the saddle is driven over substantially its range of positions from retracted to extended without being displaced from a vertical position, said guard including means for attaching it to the jack, and wherein the guard includes as said attaching means, longitudinally extending and projecting top walls which serve to hold the wheels and thus the jack in the guard, and wherein the top walls include cut-out sections which allow the wheels of the jack to be inserted from the top into the guard and removed from it, said cut-out sections being located such that the wheels admitted thereby are not adjacent the portion at either extent of their horizontal displacement in the guard so that the jack will not normally move out of the guard.

2. The accessory of claim 1 wherein a handle is formed at one end of the guard whereby the guard and any captivated jack may be carried by the handle.

3. In combination, a wheeled jack of the type that in normal use must move horizontally when raising an object vertically;

guard means for shielding the wheels from the ambient surface and for providing a path for such wheels to roll over during normal use, said guard means including a bottom extending horizontally only a distance approximately equal to that needed for the horizontal motion of the jack in normal use in raising an object vertically; and means for releasably securing the guard means to the jack so that the two may be transported and moved as one, said last-mentioned means including sidewalls connected to said bottom, which sidewalls extend parallel to one another and are separated by approximately thw width of the jack's wheels, and top walls connected to the sidewalls and projecting over parts of the jack so as to prevent the jack and guard from separating during normal handling and use, and wherein the jack has a handle and means are provided for securing the handle to the guard.

4. The invention of claim 3 wherein the handle of the jack is segmented and tubular and said means for securing the handle includes pairs of outstanding spaced-apart tabs which may project into the ends of the handle sections.

5. An accessory for a wheeled floor jack of the type that has a link-mounted saddle for contacting a weight to be lifted, a frame, and which saddle and frame move horizontally relative to one another as the saddle is driven from its vertically-retracted to its vertically-extended position, and wherein there are a plurality of wheels mounted to the frame to allow the jack to roll on a hard surface while being used, comprising:

a guard, sized and shaped to encompass the wheels and to provide a flat, hard surface for the wheels to roll on, said guard defining a hard-surface operational path for the wheels which is long enough for the jack to move horizontally within the guard while the saddle is driven over substantially its range of positions from retracted to extended without being displaced from a vertical position, said guard including means for attaching it to the jack, and wherein means are provided to releasably retain the jack in the rearmost position in the guard and to prevent unwanted movement of the jack secured thereto during storage, but allowing the secured jack to roll forward along the operational path when the jack is used to raise a load.

6. The accessory of claim 5 wherein said retaining means is a resilient tensioning member secured to the guard at its one end and to the jack at its other end.

7. An accessory for a wheeled floor jack of the type that has a link-mounted saddle for contacting a weight to be lifted, a frame, and which saddle and frame move horizontally relative to one another as the saddle is driven from its vertically-retracted to its vertically-extended position, and wherein there are a plurality of wheels mounted to the frame to allow the jack to roll on a hard surface while being used, comprising:

a guard, sized and shaped to encompass the wheels and to provide a flat, hard surface for the wheels to roll on, said guard defining a hard-surface operational path for the wheels which is long enough for the jack to move horizontally within the guard while the saddle is driven over substantially its range of positions from retracted to extended without being displaced from a vertical position, said guard including means for attaching it to the jack, and wherein said guard includes a flat bottom and sidewalls which extend parallel to one another and are separated by the width of the jack's wheels, and said guard includes front and back walls, and wherein said guard's front and back walls are formed to be conforming, in part, in curvature to the wheels and allow the wheels to run up thereto.

* * * * *